United States Patent [19]
Wilson

[11] Patent Number: 5,335,748
[45] Date of Patent: Aug. 9, 1994

[54] ANTI-THEFT APPARATUS

[76] Inventor: Richard H. Wilson, 2012 Pierce St., No. 1, San Francisco, Calif. 94115

[21] Appl. No.: 136,138

[22] Filed: Oct. 15, 1993

[51] Int. Cl.⁵ ............................................. B60R 21/00
[52] U.S. Cl. .................................... 180/270; 180/287
[58] Field of Search ............... 180/268, 270, 271, 287; 280/801 R

[56] References Cited

U.S. PATENT DOCUMENTS

| | | |
|---|---|---|
| 3,943,376 | 3/1976 | Long . |
| 4,682,062 | 7/1987 | Weinberger . |
| 4,762,198 | 8/1988 | Vagnone et al. . |
| 4,852,680 | 8/1989 | Brown et al. . |
| 4,891,478 | 1/1990 | Gold et al. . |
| 4,940,964 | 7/1990 | Dao . |
| 4,955,453 | 9/1990 | Nishioka et al. ....................... 180/287 |
| 5,006,843 | 4/1991 | Hauer . |
| 5,023,591 | 6/1991 | Edwards ............................. 180/287 |
| 5,133,425 | 7/1992 | Han ..................................... 180/270 |
| 5,179,868 | 1/1993 | Thibeault . |

Primary Examiner—Kenneth R. Rice
Attorney, Agent, or Firm—Douglas E. White

[57] ABSTRACT

A vehicular anti-theft apparatus uses the unbuckling of a seatbelt to produce a surreptitious signal that activates a timing circuit which disables the motor after a preselected period of time. When the seatbelt is unfastened, an electrical signal is generated by a sensor switch within the seatbelt buckle and sent to the timing circuit. This circuit activates a solenoid after the preselected time has elapsed. Activation of the solenoid opens the ignition circuit, which makes the vehicle stall. In order for the motor to be restarted, the timing circuit must be reset using a circuit control keypad. The circuit control keypad is a separate and portable hand-held push-button device that allows an authorized operator manually to enter a secret code. The circuit control keypad plugs into a hidden port, thereby electrically interfacing with the timing circuit.

17 Claims, 3 Drawing Sheets

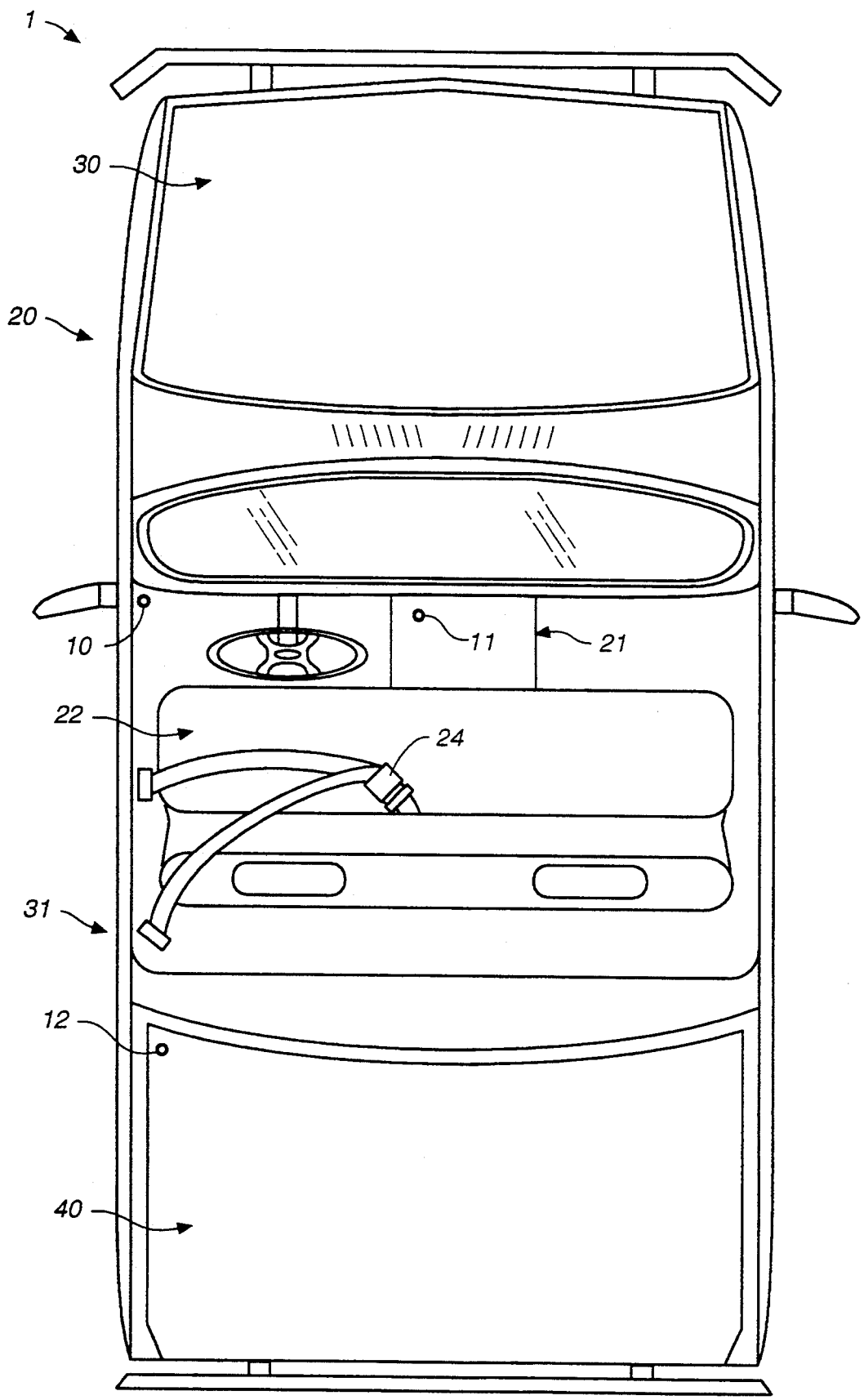
FIG._1

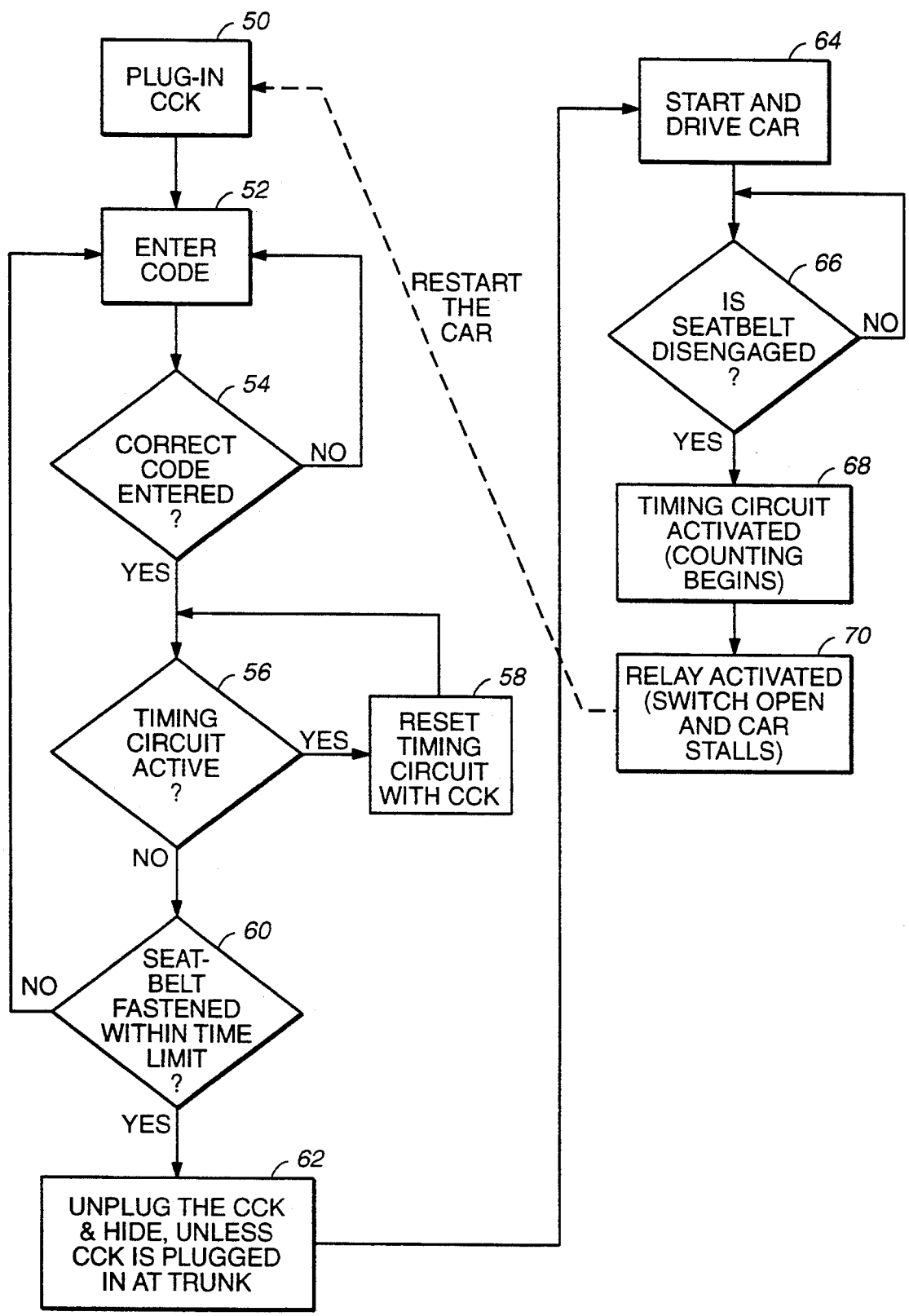
FIG._2

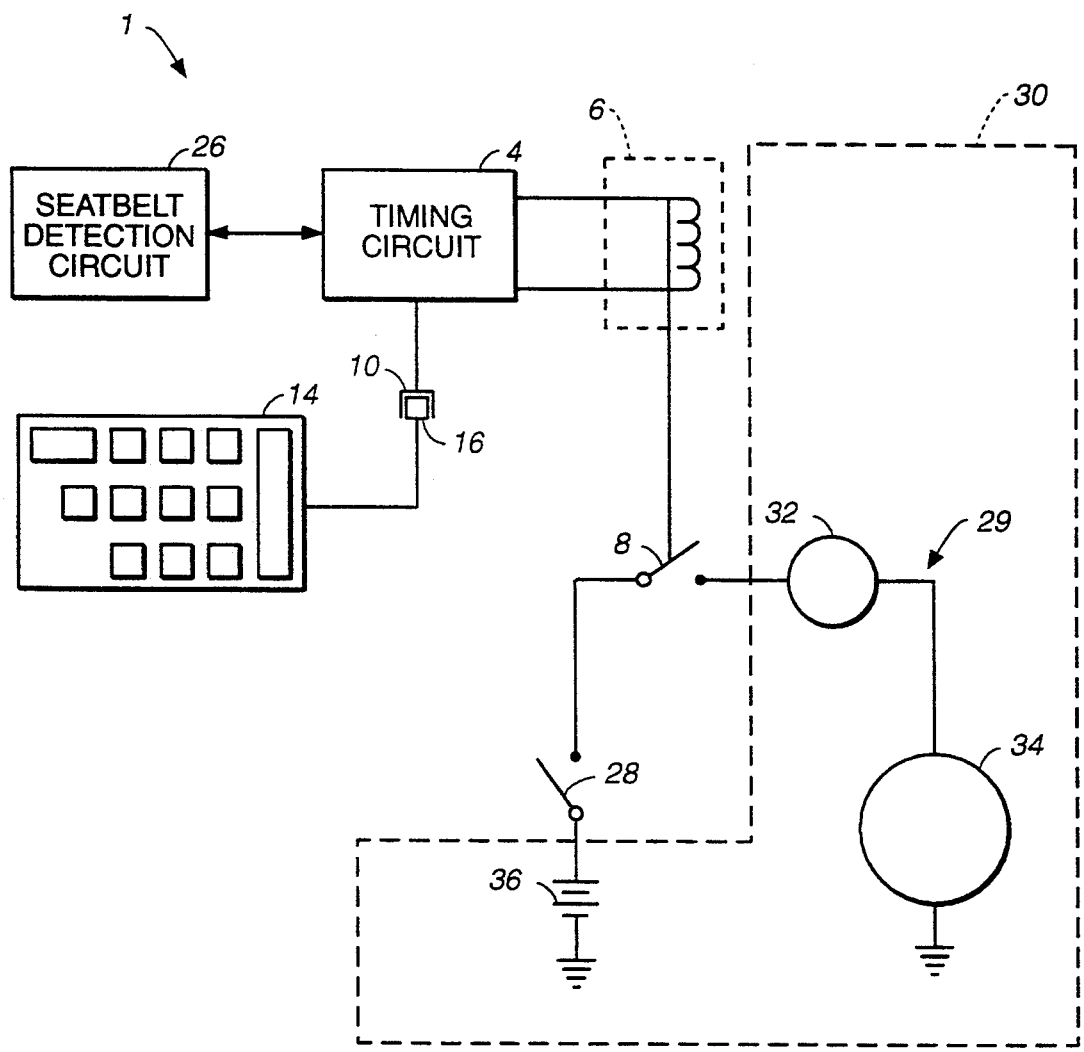
FIG._3

ANTI-THEFT APPARATUS

FIELD OF THE INVENTION

This invention relates to automotive anti-theft systems, more particularly to a timing circuit controlled by a seatbelt detection circuit, which timing circuit disables vehicle operation in the absence of timely reception of coded signals.

BACKGROUND OF THE INVENTION

The search for effective anti-theft apparatus has been imbued with greater urgency due to the recent surge in what has come to be known as "carjacking" i.e. the forceful commandeering of a vehicle while occupied. In this type of crime, an armed thief approaches a vehicle and demands that the occupants exit and turn over the vehicle, whereupon the thief enters it and drives away. Obviously, the presence of traditional anti-theft mechanisms, namely, those which prevent a vehicle from being started, will only cause the thief to demand that the occupants reveal the hidden switch location, the secret code, or the like. More ominously, such delays are likely to provoke anger and violence on the part of the criminal.

Therefore, there is a need for a system which is activated surreptitiously and which delays the disabling of a vehicle until after the thief has left the vicinity of the crime—thus placing the occupants out of harm's way.

Prior developments in this field may be generally illustrated by reference to the following information disclosure statement:

| Pat. No.  | Patentee        | Issue Date    |
|-----------|-----------------|---------------|
| 4,940,964 | V. Dao          | Jul. 10, 1990 |
| 3,943,376 | D. Long         | Mar. 09, 1976 |
| 5,006,843 | W. Hauer        | Apr. 09, 1991 |
| 4,682,062 | Z. Weinberger   | Jul. 21, 1987 |
| 4,852,680 | T. Brown et al. | Aug. 01, 1989 |
| 5,179,868 | R. Thibeault    | Jan. 19, 1993 |
| 4,762,198 | L. Vagnone et al.| Aug. 09, 1988|
| 4,891,478 | P. Gold et al.  | Jan. 02, 1990 |

Electronic circuits for detecting the seatbelt state (i.e. whether it is fastened or unfastened) have been used to sound alarms while in the unfastened-seatbelt state and even to prevent vehicles from being started. See, for example, U.S. Pat. No. 3,943,376. Heretofore, however, it has not been proposed to use a seatbelt to secretly activate a time-delayed anti-theft system.

U.S. Pat. No. 4,940,964 teaches a remote keypad which communicates with an anti-theft system by radio frequency signals. U.S. Pat. Nos. 5,006,843, 4,682,062 and 4,852,680 teach keypads used to control locking systems within vehicles. The rest of the patents are representative of what is in the art.

SUMMARY OF THE INVENTION

The present invention is a vehicular anti-theft apparatus which uses the unbuckling of a seatbelt to produce a surreptitious signal that activates a timing circuit. The timing circuit then disables the vehicle after a preselected period of time. At that point, the thief, having left the crime scene, will not be able to exact revenge on the victims. While the present invention will not prevent a driver from being accosted, it will help prevent the thief from obtaining permanent possession of the vehicle.

Furtive operation of the device is essential to its success. The device is activated whenever the seatbelt is unlatched. When the seatbelt is unfastened, an electrical signal is generated by a sensor switch within the seatbelt buckle and sent to the timing circuit. This circuit activates a relay or solenoid, but only after a preselected period of time has elapsed (e.g. 90 seconds). Activation of the relay cuts the power to the ignition circuit (i.e. "opens" it), which makes the vehicle stall. Thereafter, in order for the vehicle to start (or to be prevented from stalling after seatbelt release), the timing circuit must be reset using an encoder, herein called the circuit control keypad (CCK). The CCK is a separate and portable hand-held push-button device (similar to a calculator) which allows an authorized operator manually to enter a secret code. The CCK removably plugs into any one of a number of alternate port locations which are not readily visible (i.e., under the driver's seat, behind the dashboard, hidden in the floor console, inside the trunk, etc.), in order to interface with those circuits of the anti-theft apparatus which are permanently installed within the vehicle.

When a thief tells you to get out of your car, or similar motor vehicle, you must unbuckle your seatbelt to do so. Unbuckling the seatbelt triggers the timing circuit without drawing attention. After the thief drives away, the car will stall following a preselected period of time and cannot be restarted. The thief is forced to abandon the car. Optionally, before or after the car stalls an alarm could be activated to draw attention to the thief.

The hand-held CCK can be stored anywhere. Its keypad must be used to start the car. For example, a driver pulls into his garage, turns off the motor, unbuckles his seatbelt and leaves the car. The timing circuit will activate the relay after a set time. When the driver returns to his car to leave, he must use the keypad to reset the device before the motor may be started. Therefore, this invention doubles as a standard anti-theft apparatus, for use in situations in which the vehicle will be left unattended.

Multiple levels of protection are afforded through use of the present invention. First, the CCK is required (it could be hidden in the car or taken out of the car) and, second, if the CCK somehow is obtained by a potential thief, the secret code still must be entered before the car will start.

The CCK is also used to change the code at the option of the user; to set the time delay or change it; and to deactivate the timing circuit in case the seatbelt will be unbuckled intentionally while the motor is running.

To prevent the proliferation of circuit control keypads by carjackets, each CCK will put out a pulsed signal which must be verified by the anti-theft circuit into which it is plugged. There could be ten, fifteen, or more, different pulsed CCKs manufactured. This means that a carjacker would have to have all CCK versions and then would need to try each one to get a matched pulse. Finally, she must know the code number.

FEATURES AND ADVANTAGES

An object of this invention is to disclose anti-theft apparatus for a motor vehicle. Preferably, the apparatus includes a seatbelt which may be said to have fastened and unfastened states. Means for enabling and disabling the motor are also provided, as is a seatbelt detection circuit for generating first and second signals depending on, respectively, the fastened state or the unfastened state of the seatbelt. Also included are means for generating coded third signals and a timing circuit for receiving the first and second signals from the seatbelt detection circuit and the coded third signals from the coded-signal generating means.

The timing circuit generates fourth signals after a preselected period of time after receiving second signals from the seatbelt detection circuit, which fourth signals cause the motor enabling/disabling means to disable the motor. The timing circuit generates fifth signals upon receipt of coded third signals from the coded-signal generating means and first signals from the seatbelt detection circuit, which fifth signals cause the motor enabling/disabling means to enable the motor.

An additional feature is that the motor enabling/disabling means includes electrical relay means which acts upon an ignition circuit for running the motor in a closed ignition circuit state and stopping the motor in an open ignition circuit state. The electrical relay means includes a switch and a solenoid for opening the switch and the ignition circuit upon receipt of fourth signals from the timing circuit and for closing the switch and the ignition circuit upon receipt of fifth signals from the timing circuit.

Yet another feature or advantage is that the apparatus further includes means in the coded-signal generating means for resetting the preselected period of time.

Another feature is the provision of means in the coded-signal generating means for deactivating the timing circuit so as to keep the ignition circuit closed even upon receipt by the timing circuit of second signals from the seatbelt detection circuit.

Additionally, the timing circuit may include means for verifying the authenticity of the circuit control keypad from which it receives coded third signals.

Another feature is an apparatus which is easy to use and suitable for mass production at relatively low cost.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 1 is a schematic plan view of an automobile into which the apparatus of this invention has been installed;

FIG. 2 is a schematic flow chart illustrating the anti-theft process of the invention; and FIG. 3 is a schematic circuit diagram illustrating the CCK, the circuits of the apparatus, and the interface between the invention and the pre-existing vehicle ignition circuit.

DRAWING REFERENCE NUMERALS

1—anti-theft apparatus
4—timing circuit
6—solenoid
8—switch, activated by 6
10—port for 16
11—port, alternate
12—port, alternate
14—keypad, circuit control
16—connector
20—vehicle
21—consol
22—seatbelt
24—seatbelt detection switch
26—seatbelt detection circuit
28—ignition switch
29—ignition circuit
30—motor compartment
31—passenger compartment
32—ignition coil
34—distributor
36—battery
40—trunk
50–70—process steps

DESCRIPTION OF A PREFERRED EMBODIMENT

Referring to FIG. 1, there is illustrated therein a motor vehicle 20, such as a convertible car, into which has been installed an anti-theft apparatus 1 of this invention. Apparatus 1 is best seen schematically illustrated in FIG. 3.

The car 20 has at least one seatbelt 22, into the fastening buckle of which is incorporated a sensor or switch 24 for determining the fastened or unfastened state of the seatbelt 22. The state of detection switch 24 produces a corresponding signal in the seatbelt detection circuit 26 of the car. Virtually all new automobiles come with such detection circuits pre-installed, principally to sound alarms reminding occupants to fasten their seatbelts.

Continuing to refer generally to FIGS. 1 and 3, in addition to the seatbelt 22, the passenger compartment 31 of the vehicle 20 may have an electrical interface port into which the connector 16 of the circuit control keypad (CCK) 14 may be plugged. The connector port preferably will be hidden in an out of the way, but readily accessible, location. For example, port 10 would be behind the dashboard and port 11 would be in the floor console 21, perhaps behind a hidden door. A good location for a CCK connector port would be locked in the trunk 40 of the car 20, such as port 12. It is to be understood that, while multiple ports 10–12 have been included in the drawing for purposes of illustration, there would likely be only one or two ports in an actual installation of the apparatus 1.

FIG. 3 is a schematic circuit diagram illustrating the CCK 14, the circuits of the apparatus (including the timing circuit 4), and the interface between the invention and the pre-existing vehicle ignition circuit 29, which latter circuit is located under the hood, in the motor compartment 30. The ignition circuit 29 includes the ignition coil 32, the distributor 34, and the vehicle battery 36. The ignition switch 28, of course, is located in the passenger compartment 31.

Assume that the seatbelt detection circuit 26 has signalled the occurrence an unfastened seatbelt state. After a preselected period of time, the timing circuit 4 activates solenoid 6, causing switch 8 of the apparatus 1 to open. This opens the ignition circuit 29, and causes the car 20 to stall (and/or prevents it from being started). As can be seen in FIG. 3, this occurs irrespective of the state of the vehicle ignition switch 28. Solenoid 6 and switch 8 together may be said to comprise electrical relay means for opening and closing the ignition circuit 29 (in cooperation, of course, with the ignition switch 28).

Alternatively (or additionally), the relay means could operate to close a fuel line valve, sound the horn, activate voice warnings, or engage any of the other vehicle/motor disabling means which previously have been suggested in the art. Similarly, the timing and encoding/decoding circuits of the CCK 14 and of the timing circuit 4 are conventional and well within the skill of the average practitioner. Examples of such circuitry may be found in several of the patents contained the the disclosure statement above. It is, however, the use of such circuitry in the innovative combination disclosed herein which has not been known heretofore.

Operation of the anti-theft apparatus 1 of this invention may be understood by having reference to the flow chart schematic in FIG. 2.

Once the apparatus is installed, it becomes necessary to plug in the CCK 14 and input the pre-set password or code (steps 50 and 52) before the car can be started. If the correct code is not entered (step 54), the timing circuit 4 (which includes decoding means) may allow a few re-entries before setting a period of longer-term motor disablement. This will accommodate natural human error, yet prevent thieves from testing a series of codes at random. The timing circuit also includes means for verifying the authenticity of the particular CCK from which it is receiving coded signals.

The timing circuit may have been inactivated—for example, to allow the motor to run while the seatbelt 22 is unfastened. Steps 56 and 58 will reactivate the circuit upon entry of the proper code.

Provided the seatbelt previously has been fastened or becomes fastened within a preselected period of time from the entry of the code (step 60), the CCK 14 may be unplugged and hidden on the operator's person or elsewhere (unless it is connected in the trunk 40, in which latter case it typically need never be unplugged—step 62).

At this point, the car may be started with the ignition switch 28 and driven in the normal manner (step 64). However, should the seatbelt 22 become disengaged (step 66), the seatbelt detection circuit 26 will so signal the timing circuit 4. This starts the preselected delay period to begin (step 68). Within this delay period, the code must be re-entered, else the relay means (solenoid 6 and switch 8) will be activated, opening the ignition circuit 29 and stalling the vehicle (step 70). Thereafter, the CCK 14 must be re-plugged and code re-entered (step 50) before the ignition circuit can be closed and the motor re-started.

Of course, removing the seatbelt 22 may simply indicate that an authorized ride is over; in which event, the apparatus 1 automatically sets up in standard anti-theft mode for unattended vehicle protection. However, if the seatbelt has become unfastened because of a carjacking, even for a brief period, the car 20 will stall only after the thief has left the scene of the crime, and the victims, behind. At that point, having neither CCK nor code, the thief will have little choice but to abandon the vehicle. Of course, the thief could attempt to disable the apparatus 1, but this would be a lengthy process. It would have to be done out in the open and at only a short distance from the crime scene. The thief will realize that the crime and the probable location of the car soon will be reported, and invariably will leave the car and flee.

While the above provides a full and complete disclosure of the preferred embodiments of this invention, various modifications, alternate constructions, and equivalents may be employed without departing from the true spirit and scope of the invention. Such changes might involve alternate materials, components, structural arrangements, sizes, operational features or the like.

For example, should thieves become familiar with the existence and operation of devices of this type, they may try to forcibly obtain the CCK and code from their victims. Realizing that one may be asked under duress to give out the code, the keypad optionally could be configured to accept a "dummy" code that would shut off the car motor after a much longer period than that resulting from mere activation of the seatbelt.

An alternative to plugging the CCK 14 into a concealed port 10-12 would be to substitute a CCK that would send its coded signals to the timing circuit 4 by means of radio frequencies.

Therefore, the above description and illustrations should not be construed as limiting the scope of the invention which is defined by the appended claims.

What is claimed is:

1. Anti-theft apparatus in combination with a motor vehicle including:
   a seatbelt having fastened and unfastened states;
   a motor;
   means for enabling and disabling the motor;
   a seatbelt detection circuit for generating first and second signals depending on, respectively, the fastened state or the unfastened state of the seatbelt;
   means for generating coded third signals; and
   a timing circuit for receiving the first and second signals from the seatbelt detection circuit and the coded third signals from the coded-signal generating means,
      the timing circuit generating fourth signals after a preselected period of time after receiving second signals from the seatbelt detection circuit,
      which fourth signals cause the motor enabling-/disabling means to disable the motor and
      the timing circuit generating fifth signals upon receipt of coded third signals from the coded-signal generating means and first signals from the seatbelt detection circuit,
      which fifth signals cause the motor enabling-/disabling means to enable the motor.

2. The apparatus of claim 1 wherein:
   the motor enabling/disabling means includes electrical relay means.

3. The apparatus of claim 2 wherein:
   the motor enabling/disabling means further includes an ignition circuit for running the motor in a closed ignition circuit state and for stopping the motor in an open ignition circuit state; and
   the electrical relay means includes
      a switch, and
      a solenoid for opening the switch and the ignition circuit upon receipt of fourth signals from the timing circuit and for closing the switch and the ignition circuit upon receipt of fifth signals from the timing circuit.

4. The apparatus of claim 3 further including:
   means in the coded-signal generating means for resetting the preselected period of time.

5. The apparatus of claim 4 further including:
   means in the coded-signal generating means for deactivating the timing circuit so as to keep the ignition circuit closed even upon receipt by the timing circuit of second signals from the seatbelt detection circuit.

6. The apparatus of claim 1 further including:
at least one port for removably establishing direct electrical interconnection between the coded-signal generating means and the timing circuit.

7. The apparatus of claim 6 further including:
a lockable trunk, the port being located in the trunk.

8. The apparatus of claim 1 wherein:
the coded-signal generating means is a portable pushbutton circuit control keypad.

9. The apparatus of claim 8 wherein:
the timing circuit includes
 means for verifying the authenticity of the circuit control keypad from which it receives coded third signals.

10. Anti-theft apparatus in a motor vehicle including:
a seatbelt having fastened and unfastened states;
a motor having an ignition circuit;
electrical relay means for opening and closing the ignition circuit;
a seatbelt detection circuit for generating first and second signals depending on, respectively, the fastened state or the unfastened state of the seatbelt;
a circuit control keypad for generating coded third signals; and
a timing circuit for receiving the first and second signals from the seatbelt detection circuit and the coded third signals from the circuit control keypad,
 the timing circuit generating fourth signals after a preselected period of time after receiving second signals from the seatbelt detection circuit,
  which fourth signals cause the electrical relay means to open the ignition circuit, thereby disabling the motor, and
 the timing circuit generating fifth signals upon receipt of coded third signals from the circuit control keypad and first signals from the seatbelt detection circuit,
  which fifth signals cause the electrical relay means to close the ignition circuit, thereby enabling the motor.

11. The apparatus of claim 10 wherein:
the electrical relay means includes
 a switch, and
 a solenoid for opening the switch and the ignition circuit upon receipt of fourth signals from the timing circuit and for closing the switch and the ignition circuit upon receipt of fifth signals from the timing circuit.

12. The apparatus of claim 11 further including:
means in the circuit control keypad for resetting the preselected period of time.

13. The apparatus of claim 11 further including:
means in the circuit control keypad for deactivating the timing circuit so as to keep the ignition circuit closed even upon receipt by the timing circuit of second signals from the seatbelt detection circuit.

14. The apparatus of claim 13 further including:
means for establishing operable interconnection between the circuit control keypad and the timing circuit.

15. The apparatus of claim 14 further including:
a lockable trunk, the circuit control keypad being located in the trunk.

16. Anti-theft apparatus in a motor vehicle including:
a seatbelt having fastened and unfastened states;
a seatbelt switch in the seatbelt which is closed in the fastened state and open in the unfastened state;
a motor having an ignition circuit;
a solenoid for opening and closing the ignition circuit;
a seatbelt detection circuit for generating first and second signals depending on whether the seatbelt switch is closed or open, respectively;
a portable hand-held circuit control keypad for generating coded third signals;
a timing circuit for receiving the first and second signals from the seatbelt detection circuit and the coded third signals from the circuit control keypad,
 the timing circuit generating fourth signals after a preselected period of time after receiving second signals from the seatbelt detection circuit,
  which fourth signals cause the solenoid to open the ignition circuit, thereby disabling the motor,
 the timing circuit generating fifth signals upon receipt of coded third signals from the circuit control keypad and first signals from the seatbelt detection circuit,
  which fifth signals cause the solenoid to close the ignition circuit, thereby enabling the motor; and
at least one port for removably connecting the circuit control keypad to the timing circuit.

17. The apparatus of claim 16 further including:
means in the circuit control keypad for resetting the preselected period of time; and
means in the circuit control keypad for deactivating the timing circuit so as to keep the ignition circuit closed even upon receipt by the timing circuit of second signals from the seatbelt detection circuit.

* * * * *